US006727002B2

United States Patent
Hoch et al.

(10) Patent No.: US 6,727,002 B2
(45) Date of Patent: Apr. 27, 2004

(54) EVOH AND EVM IN SINGLE- OR MULTILAYER PRODUCTS

(75) Inventors: Martin Hoch, Heinsberg (DE); Ulrich Itter, Wuppertal (DE); Roland Parg, Leverkusen (DE); Claus Wrana, Cologne (DE); Helmut Schulte, Krefeld (DE); Peter Schwarz, Krefeld (DE); Ralph Ulrich, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/212,314

(22) Filed: Aug. 5, 2002

(65) Prior Publication Data

US 2003/0134982 A1 Jul. 17, 2003

(30) Foreign Application Priority Data

Aug. 8, 2001 (DE) .......................... 101 37 972
Apr. 8, 2002 (DE) .......................... 102 15 293

(51) Int. Cl.$^7$ .............................................. B32B 27/30
(52) U.S. Cl. ..................... 428/520; 428/522; 428/475.8; 428/476.3; 428/476.9; 525/57; 264/173.19
(58) Field of Search ............................ 525/57; 428/516, 428/520, 522, 475.8, 476.3, 476.9; 264/173.19

(56) References Cited

U.S. PATENT DOCUMENTS

| | | | |
|---|---|---|---|
| 4,389,450 A | 6/1983 | Schaefer et al. | 428/212 |
| 4,400,428 A | 8/1983 | Rosenthal et al. | 428/349 |
| 4,587,295 A | * 5/1986 | Giles, Jr. et al. | 525/57 |
| 4,883,696 A | 11/1989 | Iwanami et al. | 428/35.4 |
| 4,939,076 A | 7/1990 | Mueller | 333/476.9 |
| 4,952,628 A | 8/1990 | Blatz | 309/58 |
| 4,977,022 A | 12/1990 | Mueller | 333/349 |
| 5,055,355 A | 10/1991 | DeAntonis et al. | 132/476.3 |
| 5,069,946 A | * 12/1991 | Moritani et al. | 428/36.6 |
| 5,096,738 A | 3/1992 | Wyman | 476/44 |
| 5,110,855 A | 5/1992 | Blatz | 309/441 |
| 5,177,138 A | 1/1993 | Moriyama et al. | 483/437 |
| 5,194,306 A | 3/1993 | Blatz | 309/354 |
| 5,214,090 A | 5/1993 | Moriyama et al. | 483/424 |
| 5,280,065 A | 1/1994 | Moriyama et al. | 483/57 |

(List continued on next page.)

FOREIGN PATENT DOCUMENTS

| | | |
|---|---|---|
| EP | 0 274 748 | 7/1988 |
| EP | 0 326 827 | 8/1989 |
| EP | 0 603 519 | 10/1989 |
| EP | 0 454 850 | 11/1991 |
| GB | 1 567 189 | 5/1980 |

(List continued on next page.)

OTHER PUBLICATIONS

Polymer Networks & Blends, (month unavailable) 1997, 7(4), pp. 139–146, "Permeation Through Strongly Interacting Polymer Blends: EVOH/Copolyamide–6/6.9" by Y. Nir et al.

(List continued on next page.)

Primary Examiner—D. Lawrence Tarazano
(74) Attorney, Agent, or Firm—Joseph C. Gil; Jennifer R. Seng (57) ABSTRACT

The present invention relates to a single- or multilayer product containing α-olefin-vinyl alcohol copolymers and at least one α-olefin-vinyl acetate copolymer, wherein the amount of vinyl acetate repeat units present in the α-olefin vinyl acetate copolymer is in the range from 35 to 99.99% by weight, and these repeat units have good flexibility which permits processing films or other thin-walled items which are transparent after stretching or thermoforming, and to a process for producing the same, and to their use as packaging films.

17 Claims, 2 Drawing Sheets

U.S. PATENT DOCUMENTS

| | | | |
|---|---|---|---|
| 5,298,334 A | | 3/1994 | Moriyama et al. ........ 440/474.4 |
| 5,310,788 A | | 5/1994 | Moriyama et al. ............ 440/57 |
| 5,344,715 A | | 9/1994 | Negi et al. ................... 545/520 |
| 5,399,619 A | * | 3/1995 | Torradas et al. .............. 525/57 |
| 5,541,011 A | | 7/1996 | Takashige et al. .......... 540/213 |
| 5,925,305 A | | 7/1999 | Takashige et al. .......... 540/519 |
| 5,938,869 A | | 8/1999 | Kaido et al. ................ 761/510 |
| 5,993,977 A | | 11/1999 | Laiho et al. ................ 820/514 |
| 6,045,895 A | | 4/2000 | Hyde et al. ................. 428/213 |
| 6,054,529 A | * | 4/2000 | O'Donnell et al. ........... 525/57 |
| 6,079,465 A | | 6/2000 | Takeyama et al. .......... 722/510 |
| 6,280,845 B1 | | 8/2001 | Kollaja et al. ............ 428/411.1 |
| 6,334,919 B1 | | 1/2002 | Takeyama et al. .......... 722/123 |
| 6,451,911 B1 | | 9/2002 | Bertin et al. .................. 525/63 |
| 2001/0049025 A1 | | 12/2001 | Kollaja et al. ............... 428/521 |
| 2002/0004112 A1 | | 1/2002 | Muller et al. .............. 428/35.3 |
| 2002/0099134 A1 | | 7/2002 | Bertin et al. ................... 525/57 |

FOREIGN PATENT DOCUMENTS

| | | |
|---|---|---|
| JP | 62-83144 | 4/1987 |
| JP | 1-221241 | 9/1989 |
| JP | 1-255535 | 10/1989 |
| JP | 4-131237 | 5/1992 |
| JP | 4-169231 | 6/1992 |
| JP | 6-255054 | 9/1994 |
| JP | 8-207927 | 8/1996 |
| JP | 9-39172 | 2/1997 |
| JP | 9-39182 | 2/1997 |
| JP | 11-227118 | 8/1999 |

OTHER PUBLICATIONS

Korea Polymer Journal, vol. 6, No. 5, pp. 389–395 (month available) 1998, "Phase Behavior and Hydrogen Bonding in Poly(ethylene–co–vinyl alcohol)/Poly(N–vinyl–2–pyrrolidone) Blends" by So–Bong Ahn et al.

Polymer (Korea), vol. 23, No. 6, pp. 837–843, (month unavailable) 1999, "Miscibility of Poly(ethylene–co–vinylalcohol) with Poly(4–vinylpyridine–costyrene)" by So–Bong Ahn et al.

Polymer Engineering and Science, Mar. 1990, vol. 30, No. 6, pp. 341–349, "Binary Blends of Nylons With Ethylene Vinyl Alcohol Copolymers: Morphological, Thermal, Rheological, and Mechanical Behavior" by Tae Oan Ahn et al.

* cited by examiner

EVOH AND EVM IN SINGLE- OR MULTILAYER PRODUCTS

FIELD OF THE INVENTION

The present invention relates to a single- or multilayer product containing α-olefin-vinyl alcohol copolymers and at least one α-olefin-vinyl acetate copolymer, wherein the amount of vinyl acetate repeat units present in the α-olefin vinyl acetate copolymer is in the range from 35 to 99.99% by weight. These repeat units have good flexibility which permits the processing of films or other thin-walled items which are transparent after stretching or thermoforming, and to a process for producing the same, and to their use as packaging films.

BACKGROUND OF THE INVENTION

Shrink packaging, "skin-pack" system processes and stretching processes are used in particular for packaging films. EVOH is a very brittle material and the corresponding films have poor flexibility. On the other hand, EVOH films have excellent gas barrier properties, making EVOH the preferred material for boundary layers in multilayer films. EVOH has also been proposed for fuel hoses.

WO-99/28124-A1 shows that stress-strain curves are highly dependent on the build of the film. High strain values may be achieved with multilayer builds of up to 61 layers, and these are compared with three layers. However, the technical requirements for producing a film of this type are high, and therefore difficult to achieve with EVOH-containing films.

Examples of modifications to the EVOH resins using nylon-type polymers are described in Ahn, Tae Oan; Kim, Chang Kee; Kim, Byung Kyu; Jeong, Han M O; Huh, Jung. Dep. Chem. Technol., Seoul National. Univ, Seoul, S. Korea. Polym. English. Sci. (1990), 30(6), 341-9. In Ahn, So-Bong; Jeong, Han M o, Department of Chemistry, University of Ulsan, Ulsan, S. Korea, Polymer (Korea) (1999), 23(6), 837–843 the miscibility of PVPST (vinylpyridine-styrene copolymers) with EVOH is described. However, the effect on flexibility was not studied. Miscible EVOH/polyvinylpyrrolidone mixtures are disclosed in Ahn, So-Bong, Jeong, Han MO. Department of Chemistry, University of Ulsan, Ulsan, S. Korea, Korea Polym. J. (1998), 6(5), 389–395.

EP-A1-0 309 095 describes blends of EVOH with certain amorphous polyamides, but does not report any increase in the flexibility of these blends compared with pure EVOH.

EP-A2-0 820 381 describes mixtures of EVOH with polar copolymers, such as ethylene-acrylate copolymer and ethylene copolymer, these having been modified with maleic anhydride.

EP-A1-0 440 535 describes mixtures of EVOH with a PE of density from 0.900 to 0.940 and with the reaction product of a carboxylic-acid-grafted polyolefin with an oligomeric polyamide.

EP-A1-1 022 309 describes mixtures of EVOH, ethylene-acrylate copolymer and ethylene-acrylate-anhydride copolymer, which was reacted with polyamides for the purpose of coinjection with PET to manufacture parisons for bioriented bottles.

WO-98/45367-A1 claims mixtures of EVOH with ethylene-vinyl acetate copolymers for producing items with increased environmental stress crack resistance, the ethylene-vinyl acetate copolymers used having VA contents of up to about 30%. No particular requirements are placed here on oxygen transmission or permeability.

U.S. Pat. No. 5,993,977 describes multilayer composites which, alongside a PE layer impermeable to water and a paper layer, also have a layer which is impermeable to gas and which is composed of a blend of EVOH with a polar ethylene polymer. This polar ethylene polymer is regarded as a modified PE. However, the blend component claimed in the present invention is a vinyl acetate polymer, which has been modified in a nonpolar manner (with ethylene).

EP-A 0 333 443 discloses multilayer products whose layer structure comprises three different ethylene-vinyl acetate copolymer layers (EVM layers), a barrier layer, an adhesive layer and a copolyamide layer.

DE-A 26 44 209 discloses a composite film made from a polypropylene (PP) base film and from an intermediate layer of modified polyethylene (PE) and finally from an outer layer of ethylene-vinyl alcohol copolymer (EVOH). It circumvents the known difficulties with stretching of a EVOH layer by stretching the EVOH layer and the intermediate layer only in one direction, whereas the stretching of the PP film is biaxial. This requires the production of a cast PP film with subsequent monoaxial stretching, its lamination to EVOH and an intermediate layer, and then the monoaxial stretching of this composite. A disadvantage of this process is that it is composed of more than one step. This process cannot give biaxial stretching.

U.S. Pat. No. 4,400,428 discloses composite films, which comprise biaxial polyamide films and also ethylene-vinyl alcohol copolymer layers and sealable layers.

EP-A 132 565 discloses oriented multilayer films which are produced by coextruding polyamide films and ethylene-vinyl alcohol copolymers and then are monoaxially stretched.

JP-A 2001 277 419 describes films which can be used for the packaging industry and which comprise biaxially oriented nylon-6 films and a composition composed of polyurethanes, a two-layer polyurethane component, and an LLDPE film. They have good resilience and low permeability.

JP-A 2001 277 417 discloses biaxially oriented nylon-6 films adhesive-bonded to unstretched polypropylene and having low oxygen transmission.

JP-A 2001 294 279 discloses other, very complicated systems where a biaxially stretched nylon layer is provided with a polyurethane anchor layer, with polyvinyl alcohol and with protective layers.

JP-A 09039172 teaches stretching EVOH biaxially and then subjecting it to a corona surface treatment, laminating PE to both of its sides, and providing it with a biaxially stretched polyamide layer.

JP-A 09 039 182 discloses the coextrusion of polyamide (PA) with PE for biaxially stretched films and lamination to EVOH, which also comprises some polyamide, no anchor layers are needed. However, the barrier layer also has to be corona-treated.

WO 9 703 822 discloses films of high strength and low moisture transmission, composed of a monoaxially stretched layer of polyamide and EVOH and of a biaxially oriented LLDPE layer. These two layers have to be bonded by means of an intermediate polyurethane layer.

JP-A 08 207 927 discloses composite films with paper-like character without aluminum foil, a thermoplastic layer being bonded to a biaxially oriented polyamide, or to PET, or to a polypropylene layer. Vapor deposition of $SiO_2$ then takes place. The remaining layer structure comprises a EVOH or PVOH layer, which is finally bonded to two or more paper layers.

JP-A 01 255 535 laminates a biaxially oriented polyamide film to a coextruded film made from ethylene-vinyl alcohol copolymer and an ionomer (adhesive layer), to obtain a shrink film.

JP-A 06255054 discloses 3-layer films whose first layer comprises nylon-6, while the second comprises a blend of semiaromatic polyamide of MXD nylon 6007 type with ethylene-vinyl acetate copolymer and the third comprises a mixture of the materials of the first two layers. A small amount of maleic-anhydride-grafted ethylene-propylene copolymer is also added to the polyamide layers here in order to improve resistance to fracture on creasing.

Biaxially oriented polyamide blends (nylon-6,6 and MXD,6) are also disclosed in EP-A 0 540 293 as having better splittability.

JP-A 04 169 231 discloses a 3-layer film structure with a copolyamide layer, with an ethylene-vinyl alcohol copolymer layer and with another copolyamide layer. This film can be stretched biaxially, but only in a ratio of 3:1. When a polyamide of nylon-6 type is used the film becomes wrinkled after stretching. The implication is that combinations of high-melting polyamide and EVOH cannot be stretched biaxially without phase separation.

JP-A 04 131 237 discloses films made from ethylene-vinyl alcohol copolymer and nylon-6/12 blends including LiCl, these being laminated to biaxially oriented nylon-6 and to unstretched polypropylene in order to obtain films impermeable to water vapor.

JP-A 01 221 241 teaches stretching a PET film biaxially and then laminates it to a composite film made from EVA/EVOH/nylon/EVA, the composite films then being subjected to corona treatment. According to JP-A 01 221 241, EVA means an ethylene-vinyl acetate copolymer whose vinyl acetate content is not more than 35% by weight.

JP-A 62 083 144 discloses a packaging film made from a biaxially stretched ethylene-vinyl alcohol copolymer film which, after thermal treatment, is laminated to a biaxially stretched polypropylene film. A polyurethane layer is also required here as adhesive layer.

JP-A 09 220 761 discloses stretched PA/EVOH/PA films. A specific heat-conditioning program has to be complied with here prior to the stretching step.

JP-A 1998 003 5669 discloses PA and EVOH as starting materials for film extrusion processes. However, the product is merely double layers, which then can be stretched only after treatment in water.

In Polym. Networks Blends, 7 (4), 139-46 (1997), Nir et al. describe blends of ethylene-vinyl alcohol copolymer with an ethylene-vinyl acetate copolymer whose vinyl acetate content is 9% by weight.

The prior art discussed shows that a particular pretreatment is essential to permit stretching or thermoforming of a multilayer product, which contains a thermoplastic elastomer, such as polyamide or polypropylene, and ethylene-vinyl alcohol copolymer (EVOH). Although the biaxial stretching of films which comprise only polyamide is a well known process, the stretching of EVOH is, on the other hand, difficult, since it is very brittle and, due to its rapid crystallization, has only very restricted processing latitude. Therefore there is insufficient provision for the manufacture of thin, stretched film structures, unless they are manufactured by a multistage process composed of many steps. The many steps lead to disadvantages in cost-effectiveness.

SUMMARY OF THE INVENTION

An object of the present invention was to find blend components for EVOH, permitting stretching of the mixture which contain a blend component and EVOH. Another object of the present invention was to retain the underlying mechanical properties of the EVOH and its good barrier property.

A good barrier property primarily means that the product does not exhibit good oxygen transmission. However, a good barrier property also means the ability to maximize the prevention of access of other molecules, such as odorous constituents and chemicals, from the wares to be protected.

At the same time, the adhesion properties of the EVOH films should generally be improved in order to gain options for the manufacture of relatively simple multilayer films. Another object of the present invention is therefore to provide a multilayer product which, without further pretreatment, is transparent after the stretching process and also has low oxygen transmission.

Accordingly, the present invention is directed to a single- or multilayer product containing one or more α-olefin-vinyl alcohol copolymers and at least one α-olefin-vinyl acetate copolymer, wherein the amount of vinyl acetate repeat units present in the α-olefin vinyl acetate copolymer is in the range from 35 to 99.99% by weight.

DETAILED DESCRIPTION OF THE INVENTION

The single-layer product of the present invention preferably uses films containing α-olefin-vinyl alcohol copolymers and at least one α-olefin-vinyl acetate copolymer, whose content of vinyl acetate repeat units is in the range from 35 to 99.99% by weight.

The α-olefin included in the films of the single-layer product of the present invention preferably contain ethylene, propene, n-butene, isobutene, pentene, hexene, 1-hexene, heptene, octene, 1-octene, or a mixture of these.

The films of the single-layer product of the present invention preferably contain α-olefin-vinyl acetate copolymer having at least 45% by weight of vinyl acetate repeat units.

The films of the single-layer product of the present invention more preferably contain α-olefin-vinyl acetate copolymer having at least 65% by weight of vinyl acetate repeat units.

The process for producing the single-layer product of the present invention includes mixing the copolymer in a mixer with the other constituents.

The multilayer product of the present invention preferably contains at least one layer A and at least one layer B, where A contains a thermoplastic polymer and B contains an α-olefin-vinyl alcohol copolymer and an α-olefin-vinyl acetate copolymer whose vinyl acetate content is in the range from 35 to 95% by weight.

The thermoplastic polymer in the multilayer product of the present invention is preferably polyamide or polypropylene.

The α-olefin-vinyl alcohol copolymer used in the multilayer product is preferably ethylene-vinyl alcohol copolymer whose ethylene content is in the range from 20 to 75 mol %.

The α-olefin-vinyl acetate copolymer used in the multilayer product of the present invention is preferably ethylene-vinyl acetate copolymer.

The preferred layer sequence in the multilayer product of the invention is A,B,A.

The layer sequence of the multilayer product of the invention is preferably polyamide, layer B, polyamide.

The layer sequence of the multilayer product of the invention is preferably polypropylene, layer B, polypropylene.

The multilayer product of the present invention preferably has the layer sequence polypropylene, layer B, polypropylene, and between each pair of layers another layer of a polymer has been introduced and serves to improve the cohesion of the composite.

The multilayer product of the present invention is advantageously produced by coextrusion or by lamination.

The single- or multilayer product of the present invention is useful as a packaging material.

The multilayer product can readily be stretched to give thin films and once stretched has a high oxygen barrier, and tear resistance, penetration resistance and chemical resistance. This chemical resistance shown by the multilayer product applies with respect to animal and vegetable fats and oils and also to fuels and lubricants. Good mechanical properties are also found, such as high tensile strengths, elongations, module of elasticity and flexural strengths.

Another advantage of the multilayer product is that it opens up other processing opportunities, such as vacuum forming, blown-film processes, and thermoforming, and it is therefore also possible to mold three-dimensional moldings from the product of the invention. The barrier layer of the invention may be extruded relatively simply together with other layers, since flat-film dies achieve more uniform distribution. Brittleness of the barrier layer is lower in the product of the invention, achieving better resistance to fracture on creasing.

The α-olefin-vinyl alcohol copolymers of the single- or multilayer product of the present invention are copolymers of α-olefins with vinyl alcohol. These are preferably prepared by hydrolyzing α-olefin-vinyl acetate copolymers. The α-olefin-vinyl alcohol copolymers are preferably selected in accordance with the requirements placed upon the barrier property of the item to be produced. The α-olefin contents of the α-olefin-vinyl alcohol copolymers are preferably from 20 to 75 mol %, more preferably from 25 to 60 mol % and most preferably from 25 to 50 mol %.

A high degree of hydrolysis is desirable, preferably from 90 to 99.9%.

Suitable α-olefins include any of the α-olefins known to the person skilled in the art, for example ethene, propene, n-butene, isobutene, pentene, hexene, 1-hexene, heptene, octene, 1-octene and higher homologues of these. These may also bear substituents, in particular $C_1$–$C_5$-hydrocarbon radicals. Ethene and propene are preferred α-olefins.

In the case of ethylene-vinyl alcohol copolymers, there may also be other α-olefins or derived monomers present, albeit in amounts of less than 10 mol %, alongside ethylene units and vinyl alcohol units.

The molecular weight of the α-olefin-vinyl alcohol copolymer is preferably determined indirectly via MFI measurements and is important for processing performance. The flowability of the products, expressed in terms of MFI (ASTM D1238, 190° C., 2.16 kg load), is preferably from 0.5 to 100 g/10 min, more preferably from 1 to 50 g/10 min.

The selection of the α-olefin-vinyl acetate copolymer of the present invention depends on the requirements placed on oxygen transmission. This becomes smaller as the VA content of the ethylene-vinyl acetate copolymer used becomes higher. Particularly high flexibility, and therefore stretchability or thermoformability, is achieved if the VA content is not excessively high. For example, pure vinyl acetate homopolymer proves to be too brittle for some applications.

Particularly high impermeability to odor can be achieved with ethylene-vinyl acetate copolymers of the invention as a blend component if use is made of grades which preferably have high VA content. These have low swellability and, with this, low permeability to nonpolar or low-polarity compounds.

It is advantageous to use α-olefin-vinyl acetate copolymers which have only low, or no, residual crystallinity of poly-α-olefin sequences.

The α-olefin-vinyl acetate copolymers of the single- or multilayer product of the present invention preferably contain from 35 to 98% of vinyl acetate repeat units.

Suitable α-olefins include any of the α-olefins known to the person skilled in the art, for example ethylene, propene, n-butene, isobutene, pentene, hexene, 1-hexene, heptene, octene, 1-octene and higher homologues of these. Of course, these may also bear substituents, such as $C_1$–$C_5$-hydrocarbon radicals. Ethylene and propene are preferred.

Examples of preferred ethylene-vinyl acetate copolymers are available commercially from Bayer AG with the trade name LEVAPREN® or LEVAMELT®.

Preferred α-olefin-vinyl acetate copolymers are Levapren® 500 HV, Levapren® 600 HV, Levapren® 700 HV and Levapren® 800 HV. These polymers contain, respectively, 50±1.5% by weight of vinyl acetate, 60±1.5% by weight of vinyl acetate, 70±1.5% by weight of vinyl acetate, 80±2.0% by weight of vinyl acetate.

The ethylene-vinyl acetate copolymers which may be used according to the present invention have MFI values of from 0.5 to 150, preferably from 1 to 100, more preferably from 1 to 50, measured to DIN 53 735 at 130° C. with a load of 2.16 kg. The selection of the MFI value depends on the processing requirements.

Preferred α-olefin-vinyl acetate copolymers have an average (number-average) molar mass (determined by GPC) in the range from 50 kg/mol to 500 kg/mol, and Mooney viscosities to DIN 53 523 ML 1+4 at 100° C. in the range from 3 to 50, preferably from 4 to 35 Mooney units.

The α-olefin-vinyl acetate copolymers may also be used in the form of a mixture of two or more different α-olefin-vinyl acetate copolymers selected from those mentioned.

The α-olefin-vinyl acetate copolymers to be used for the α-olefin-vinyl alcohol copolymer/α-olefin-vinyl acetate copolymer blends of the present invention are preferably prepared by the solution process described in EP 341 499, EP 510 478 and DE 3 825 450. The solution processes at pressures of from 100 to 700 bar and at temperatures of from 50 to 150° C., using free-radical initiators. An advantage of this process is that it produces gel-free products in which, no other auxiliaries, such as emulsifiers are present.

The α-olefin-vinyl alcohol copolymer/α-olefin-vinyl acetate copolymer blends of the single- or multilayer product of the present invention preferably contain from 50 to 95% by weight of α-olefin-vinyl alcohol copolymers and from 5 to 50% by weight of α-olefin-vinyl acetate copolymers.

The α-olefin-vinyl acetate copolymers in layer B of the product of the present invention preferably contain from 35 to 98% of vinyl acetate repeat units.

The α-olefin-vinyl acetate copolymers can be prepared using the copolymerization processes known in the industry, for example by high-pressure copolymerization with the aid of initiators which decompose to give free radicals, by copolymerization using Ziegler, or Ziegler-Natta catalysts, or using Phillips catalysts, or else by copolymerization using metallocene-containing catalysts. This copolymerization may take place in the gas phase, in solution or in a suspension, either continuously or else batchwise.

Preparation processes of this type are known to the person skilled in the art and working in the field of rubber technology, and are described by way of example in V. E. Rohde, 141. Meeting at the ACS, Louisville 1992, and also in EP-A-0 341 499, DE-A-3 825 450 and EP-A-0 510 478. The solution polymerization without addition of other auxiliaries is the preferred process for the ethylene-vinyl acetate copolymers to be used according to the present invention.

The α-olefin-vinyl acetate copolymers/α-olefin-vinyl alcohol copolymers are preferably used in pure form. However, it is also possible to use blends with other polymers, such as polyamides. Mention may be made of polyamide resins of the nylon-6, nylon-6,6, nylon-4,6, nylon-11, nylon-12, nylon-6,10, nylon-6,12, nylon-6/6,6 copolymer, nylon-6/6,6/6, 10 copolymer, nylon-MXD,6, nylon-6,T, nylon-6/6,T copolymer, nylon-6,6/PP copolymer, and nylon-6,6/PPS type. Additions of suitable polyesters, e.g. of phthalate type, are also conceivable.

These additions may make up as much as 30% of the blend of the present invention.

Elastomers may also be added to the α-olefin-vinyl acetate copolymers/α-olefin-vinyl alcohol copolymers, and should have minimum gas transmission. Examples of these include butyl rubber, butyl rubber with p-alkylstyrene, and halogenated derivatives of these. The content should not exceed 30% within the mixture. It may then be necessary to use other compatiblizers, e.g. as described in EP-A1-0 722 850.

Additives may likewise be used in order to provide single- or multilayer products for specific final applications. These additives may be pigments, dyes, plasticizers, fillers, stabilizers, agents to absorb UV radiation, antioxidants, processing oils, or the like. The amount of additive used may vary in the range from 0.1 to 50% by weight, depending on the intended final application. It is preferable that none of the additives used absorb a significant amount of radiation close to the wavelength of the maximum absorption of any photocrosslinking agent, which may also be present in the film.

The single- or multilayer product of the invention may moreover also contain conventional fillers, such as talc, barite or kaolin or carbon black.

It is, of course, possible to modify the properties of the single- or multilayer product of the present invention by adding lamellar particles, such as muskovites or hydrotalcite, as mentioned in EP-A1-0 309 095. These lamellar fillers reduce oxygen transmission. The α-olefin-vinyl acetate copolymers used increase the ease of incorporation of mineral pigments of this type. An upstream mixing step may also be used to add these to the α-olefin-vinyl acetate copolymers/α-olefin-vinyl alcohol copolymers, and the amounts may be relatively large.

If EVOH-based barrier layers are used in shrink films, irradiation is frequently carried out prior to shrinking. This type of radiation crosslinking, as described in DE-A1-198 34 580, can be carried out using the blends of the present invention.

The barrier properties of the films of the present invention may be further improved by applying a siloxane-based coating, as described in EP-A1-0 476 202.

It is often advantageous for the film also to contain a photocrosslinking agent, which is activated by actinic radiation, typically after the coating of the polymer. Suitable photocrosslinking agents include, but are not restricted to, (a) aldehydes, such as benzaldehyde, chromophor-substituted acetaldehyde and substituted derivatives of these, (b) ketones, such as acetophenone, benzophenone and substituted derivatives of these, e.g. Sandoray™ 1000 (Sandoz Chemicals, Inc., Charlotte, N.C.), (c) quinones, such as benzoquinone, anthraquinone and substituted derivatives of these, (d) thioxanthones, such as 2-isopropylthioxanthone and 2-dodecylthioxanthone and (e) certain chromophor-substituted halomethyl-sym-triazines, such as 2,4-bis(trichloromethyl)-6-4'-methoxyphenyl-s-triazine and 2,4-bis(trichloromethyl)-6-3',4'-dimethoxyphenyl-s-triazine. Since many triazines of this type produce HCl during activation, it can also be useful to add a basic compound to the polymeric composition. The amount present of the photoactive crosslinking agent is generally in the range from 0.005 to 2% by weight, preferably from 0.01 to 0.5% by weight, and more preferably from 0.05 to 0.15% by weight of the copolymer.

However, any crosslinking required may also take place by means of high-energy radiation, such as α-, β- or γ-radiation, in the absence of crosslinker.

The present invention also provides a process for producing the single- or multilayer product of the present invention, wherein the α-olefin-vinyl acetate copolymer with the α-olefin-vinyl alcohol copolymer is mixed in a mixer with the other constituents.

Suitable mixtures of the α-olefin-vinyl acetate copolymers and α-olefin-vinyl alcohol copolymers may be prepared using any suitable mixing method, as long as the mixtures obtained are macroscopically homogeneous. Examples of suitable mixing apparatus are Banbury mixers, rolls and preferably extruders. On-line mixing operations are particularly advantageous here, e.g. those in the mixing zone of a film extruder without any other specific precautions. Where appropriate, the suitability of the planned mixing step needs to be checked by appropriate preliminary experiments. Dry blending of the materials in pellet form is advantageous for ensuring a constant mixing ratio.

The single- or multilayer product of the present invention is suitable for application to a suitable substrate to produce packaging films, such as barrier films. For example, as described in EP-A1-0 545 312, it is possible to extrude a 5-layer film whose innermost layer is composed of the single-layer product of the present invention, each of the two sides of which have been surrounded by another intermediate layer and by an outer layer.

Examples of materials of which these layers may be composed are non-inventive ethylene-vinyl acetate copolymers having VA contents of from 5 to 30%.

Suitable substrates include polyolefin films (e.g. polyethylene films and propylene films), preferably corona-treated polyolefin films and α-olefin-vinyl alcohol films, more preferably ethylene-vinyl alcohol films (EVOH).

As barrier layer, the copolymer mixture of the present invention has higher adhesion to intermediate or outer layers of this type, permitting the structure of the film to be simplified by omitting a layer.

The single-layer product of the present invention opens up the possibility of using markedly fewer layers to achieve adequate adhesion to backing films, and other processing functionalities, such as sealability.

In multilayer films, the products of the present invention may also be used as other layers beside the barrier layer. High tack can produce particularly good bonds to non-polar backing films, such as PP or polyolefins in general.

It is also possible to use the single-layer products of the present invention as an adhesive layer. This can be used as an intermediate layer between EVOH and, for example, a polyolefin backing layer. The high tack of the film of the present invention is utilized here. For this type of application, the mixing ratio may be changed in the direction of ethylene-vinyl acetate copolymers (EVM), examples being from 20/80 to 80/20 EVM/EVOH. This adhesive layer then likewise makes a much greater contribution to barrier action than typical EVA adhesive layers having VA contents of up to 30%.

The field of application of the single- or multilayer products of the present invention also extends generally to layers with barrier action.

These also include hoses, or lines for organic solvents, such as fuels. For example, as mentioned in EP-A1-0 878 509, fuel pipes can be manufactured using a layer of the single- or multilayer product. Radiation-crosslinking may then follow in order to achieve higher resilience and extensibility.

The single- or multilayer product of the present invention may also be used to produce tank liners. For this, the preferably single-layer product is applied before any crosslinker which may be used to the, preferably primed, surface of a suitable underlayer (i.e. of a substrate).

Many different processes may be used to apply the preferably single-layer product to a substrate (e.g. a belt underlayer), and these include solution coating, solution spraying, emulsion coating, gravura coating, and other processes known to persons skilled in the art.

Another preferred method of producing the single- or multilayer product is coextrusion coating, usually on a coating plant using a molten film of the α-olefin-vinyl acetate copolymer/α-olefin-vinyl alcohol copolymer, the film being melted in an extruder and applied via a slot die to a substrate which may be composed of one or more polymer layers. The resultant composite is then cooled and smoothed in a cooling and pressure-roll unit. The composite web is then wound up at an appropriate winding unit.

The operations carried out in the laminating process, which is also preferred and is similar to the coating process, are again application of the coating composition to the backing web, smoothing and cooling, draw-off and wind-up. In the actual extrusion-lamination process, a prefabricated backing web is made to run into a smoothing-roll stand which has 4 rolls. During this process, the backing web is coated, prior to the first nip, with a melt film, which is melted in an extruder and discharged via a slot die. A second prefabricated web is made to run in prior to the second nip. During passage through the second nip, the entirety of the resultant composite is smoothed and then cooled, drawn off, and wound up at a winding unit.

In the blowing/slot die extrusion process, also preferred, the α-olefin-vinyl acetate copolymer/α-olefin-vinyl alcohol copolymer and various polymers are generally first melted in various extruders under suitable conditions, and then combined in the form of the melt streams, a multilayer melt stream being shaped in the extrusion die. This is followed by the discharge, draw-off and cooling of the multilayer melt web comprising the film, and the wind-up of the composite. A composite film is thus obtained. It is preferable here to use the slot die extrusion process.

Suitable polymers for these processes include α-olefin-vinyl alcohol copolymer/α-olefin-vinyl acetate copolymer blends with thermoplastic polymers. The multilayer product of the present invention contain at least one layer A and one layer B, wherein A contains a thermoplastic polymer. Thermoplastic polymers include any desired polymers, preferably those, which can be stretched biaxially.

Preferred thermoplastic polymers are polyamides, polypropylene, polystyrene, polycarbonates, polyesters, polyethylene terephthalate, and polybutylene terephthalate.

More preference is given to the use of polyamides or polypropylene. Preferably, layer A has more than 50% by weight of polyamide or more than 50% by weight of polypropylene. More preferably, layer A has from 60 to 100% by weight of polyamide or from 60 to 100% by weight of polypropylene. The layer A preferably contains polypropylene whose melting point is in the range from 130° C. to 165° C. More preference is given to isotactic polypropylene with a crystalline fraction of more than 50%.

The layer A preferably contains polyamides with a melting point in the range from 170 to 230° C.

Polyamides mean polymers whose internal linking is via the amide group —NH CO— (see also Kunststoff-Handbuch [Plastics handbook] Volume VI, Polyamide [Polyamides], Carl Hanser Verlag, Munich, 1966). A distinction is made between two groups of polyamides:
1) built up from a monomer via polycondensation of α-aminocarboxylic acids or polymerization of their lactams to give nylon-6 type
2) built up from two monomers (diamines and dicarboxylic acids) by polycondensation to give the nylon-6,6 type (Gnauck, Fründt: Einstieg in die Kunststoffchemie [Introduction to plastics]. Carl Hanser Verlag, Munich, 1991).

Preferred polyamides are conventional polyamides, in particular nylon-6, but also copolyamides, nylon-6 with copolyamides, which can be prepared by polycondensing or, respectively, polymerizing polyamide-forming starting materials.

Preferred polyamide-forming starting materials, besides caprolactam, include other lactams, such as laurolactam, ω-aminocarboxylic acids, 11-aminoundecanoic acid, and also mixtures of equivalent amounts of one or more dicarboxylic acids, preferably adipic acid, sebacic acid, azeleic acid, dodecanedioic acid, isophthalic acid or terephthalic acid, with one or more diamines, such as hexamethylenediamine, 1,4-diaminobutane, 3-aminomethyl-3,5,5-trimethylcyclohexylamine (isophoronediamine), 4,4'-diaminodicyclohexylmethane, 4,4'-diamino-2,2-dicyclohexylpropane, m-xylylenediamine, 1,6-diamino-2,2,4-trimethylhexane, 2,2,4-trimethylhexamethylenediamine, or 2,4,4-trimethylhexamethylenediamine.

Polyolefins of this type may be prepared by polymerization methods known to the person skilled in the art, for example by Ziegler-Natta polymerization, by polymerization with the aid of Phillips catalysts, by high-pressure polymerization or by polymerization with the aid of metallocene-containing catalysts.

The coating/extrusion processes are generally carried out at temperatures in the range from 170 to 300° C., at pressures of from 250 to 400 bar and with average retention times of from 5 to 20 min. Since the α-olefin-vinyl acetate copolymers/α-olefin-vinyl alcohol copolymers have high tendency to adhere to any contact surfaces, it can be advantageous to coat the rolls used for producing the composites, and also the draw-off rolls, with a material which is antiadhesive with respect to the copolymers, both in the melt and in the single- or multilayer product of the invention, e.g. with polytetrafluoroethylene. This permits web tensions to be maintained which are appropriate, inter alia, for satisfactory winding of the composites.

The films thus obtained may advantageously be used as packaging films with barrier properties with respect to air, oxygen, odors, etc.

To produce the transparent films, the films are stretched. Besides the preferred simultaneous biaxial stretching process, sequential stretching is also possible.

For the stretching process, preferably the biaxial stretching of the product of the present invention, the procedure may be as in the patent specifications DE 3 529 586, DE 3 042 884 and DE 2 845 793.

Stretched products of the present invention may also be subjected to a downstream heat-treatment step in order to minimize shrinkage (particularly hot-water shrinkage). This step may also be carried out in an inert gas atmosphere, as described in DE-A 3 042 884, in order to avoid yellowing.

In the case of a biaxially stretched product, shrinkage may be controlled by means of a specific cooling program, as described in DE-A 2 845 793.

The stretching for the packaging material made from the product of the invention may also take place starting with the bubble ("double-bubble").

It is advantageous for another layer C to be applied to the multilayer product of the present invention and permit sealability. This layer C preferably contains a copolymer of ethylene with another monomer selected from the group consisting of α-olefins, vinyl acetate and acrylic acid. Preference is given to ethylene-α-olefin copolymers whose density is below 0.92 g/cm$^3$. Preferred ethylene-vinyl acetate copolymers are those whose vinyl acetate content is not more than 20% by weight. Preferred ethylene-acrylic acid copolymers have acrylic acid content of not more than 10% by weight. The sealable layers may be applied subsequently, preferably by lamination, but may also be introduced at the outset by coextrusion, and then passed through the stretching process.

EXAMPLES

1. Materials:

EVOH ethylene-vinyl alcohol copolymer having 44 mol % of ethylene available from Kuraray.

Levapren® 400, ethylene-vinyl acetate copolymer having 40% by weight of vinyl acetate, Mooney value ML 1+4, 100° C. of about 23, MFI of 1.5, available from Bayer AG.

Levapren® 600 HV, ethylene-vinyl acetate copolymer having 60% by weight of vinyl acetate, Mooney value ML 1+4, 100° C. of about 27, MFI of 3, available from Bayer AG.

Levapren® 800 HV, ethylene-vinyl acetate copolymer having 80% by weight of vinyl acetate, Mooney value ML 1+4, 100° C. of about 25, MFI of 4, available from Bayer AG.

Levapren® 700 HV, KA 8865 grade, ethylene-vinyl acetate copolymer having 70% by weight of vinyl acetate, MFI of 3.5, available from Bayer AG.

EVM 95, ethylene-vinyl acetate copolymer having 95% by weight of vinyl acetate, MFI of about 8, prepared as in Example 1.

AZDN V64 azoinitiator, 2,2-azobisisobutyronitrile, available from Elf Atochem.

The MFI was measured to DIN 53735, the conditions being 190° C. and 2.16 kp.

Preparation of EVM 95:

Ethylene and vinyl acetate is polymerized in a batch reactor in solution with free-radical initiation.

A 5 l reactor was charged with a solution of 1,114 g of vinyl acetate (VA) in 890 g of tert-butanol, and with a solution of 1 g of ADZN V64 azoinitiator in 50 ml of tert-butanol, and inertized by repeated introduction of nitrogen under pressure followed by depressurization. Ethylene was then introduced under pressure until the pressure was 6 bar. The mixture was then brought to a reaction temperature of 58° C. and the pressure was increased to, and held at, 8 bar, ethylene being supplemented as required by consumption.

Five hours after the start of the polymerization, 24.6% solids was determined by taking a specimen, the reactor was brought to room temperature, excess ethylene was removed by depressurization, and the mixture was discharged. The polymer was obtained by drying in a vacuum drying cabinet to constant of weight. The glass transition temperature of the product, determined by DSC, was 34.3° C. The VA content was 95% (determined by $^1$H NMR).

Examples 1 to 13 (Extrusion Examples)

Extruder (Brabender Plasti-Corder and laboratory extruder) with L/D ratio of 30/25 D with slot die. The materials used were fed in pellet form and the temperature profile set was 165° C., 170° C., 175° C. and 180° C., and the pressures set were from 45 to 60 bar. The thickness of the films was set via the throughput and via the draw-off rate. The film was cooled on a chill roll (water cooling) and wound up via two or more deflector rolls or taken off in the form of individual strips.

Polymer blends were prepared in the form of mixtures of pellets, and introduced directly to the extruder. The mixing action in the conveying extruder was itself sufficient to achieve homogeneous blends.

The resultant films were tested mechanically and for oxygen transmission.

TABLE 1

| | | Mechanical values for films | | | |
|---|---|---|---|---|---|
| Example | Material | Thickness | Max Tension | F min D | F max D |
| 1 comparison | EVOH | 31 μm | 35–50 MPa | 37 Mpa 85% | 46 MPa 190% |
| 2 comparison | EVOH | 205 μm | 45–50 MPa | 49 Mpa 300% | 62 MPa 330% |
| 3 | Blend 85% EVOH 15% Levapren ® 800 HV | 55 μm | 23 MPa | 17 Mpas 170% | 26 MPa 220% |

TABLE 1-continued

Mechanical values for films

| Example | Material | Thickness | Max Tension | F min D | F max D |
|---|---|---|---|---|---|
| 4 | Blend 70% EVOH 30% Levapren ® 800 HV | 80 µm | 25 MPa | 29 Mpa 280% | 34 MPa 290% |
| 5 | Blend 70% EVOH 30% Levapren ® 400 | 130 µm | 33 MPa | 40 Mpa 325% | 47 MPa 360% |
| 6 | Blend 85% EVOH 15% Levapren ® 400 | 122 µm | 34 MPa | 40 Mpa 320% | 46 MPa 360% |
| 7 | Blend of 70% EVOH with 30% EVM 95 | 5 µm | 20 MPa | 20 Mpa 26% | 20 MPa 37% |
| 8 | EVOH 70% 30% EVM 95 | 65 µm | 34 MPa | 35 Mpa 240% | 42 MPa 280% |

The tensile tests show that it is difficult to obtain reproducible strengths or elongations when tension is applied to pure EVOH films. For example, the breaking strengths of specimens of the same film can vary very markedly, and the same applies to the elongations. This makes it very difficult to produce monoaxially stretched or biaxially stretched films.

In contrast, the blends with ethylene-vinyl acetate copolymer prepared in the examples gave films with greater reproducibility in tensile strain values.

The film of Example 4 (blend of 70% EVOH and 30% of Levapren®400) had a distinctly tacky feel. The surface of the film was studied by IR, and comparison with the individual components revealed that the material present at the surface was almost exclusively Levapren®400. From this it can be concluded that, at least for EVA with 40% of VA as blend component in EVOH, partial incompatibility is present at least under extrusion conditions, and this mixture is therefore not preferable.

Determination of Oxygen Transmission:

The measurements were made using an OX-TRAN test device from the company Mocon, to DIN 53380 Part III.

Table 2 shows the oxygen transmissions of various ethylene-vinyl acetate copolymers at various relative humidities, the vinyl acetate contents being varied. The oxygen transmissions fall with rising vinyl acetate content, but the level of values for EVOH is not achieved.

TABLE 2

Determination of oxygen transmission for ethylene-vinyl acetate films, all at 23° C.

| Exp. | Type | Thickness | Relative humidity | Oxygen transmissions $cm^3/(m^2 d$ bar) | Standardized to 100 µ $Cm^3$ 100 µ/ $(m^2$ d bar) |
|---|---|---|---|---|---|
| 9 | EVM-95 | 272 µm | 0 | 104 | 282 |
|  |  |  | 50 | 159 | 432 |
|  |  |  | 100 | 298 | 810 |
| 10 | Levapren ® 800 HV | 64.6 µm | 0 | 1200 | 775 |
|  |  |  | 50 | 1390 | 897 |
|  |  |  | 100 | 1880 | 1210 |

TABLE 2-continued

Determination of oxygen transmission for ethylene-vinyl acetate films, all at 23° C.

| Exp. | Type | Thickness | Relative humidity | Oxygen transmissions $cm^3/(m^2 d$ bar) | Standardized to 100 µ $Cm^3$ 100 µ/ $(m^2$ d bar) |
|---|---|---|---|---|---|
| 11 | Levapren ® 700 HV | 42.5 µm | 0 | 5220 | 2220 |
|  |  |  | 50 | 5790 | 2460 |
|  |  |  | 100 | 7690* | 3270 |
|  |  | 54.1 µm | 0 | 4080 | 2210 |
|  |  |  | 50 | 4300 | 2330 |
|  |  |  | 100 | 5710* | 3090 |
| 12 | Levapren ® 400 | 74.0 µm | 0 | 33600 | 24860 |
|  |  |  | 50 | 29800 | 22050 |
|  |  |  | 100 | 19500 | 14430 |
|  |  | 70.7 µm | 0 | 12400 | 8770 |
|  |  |  | 50 | 11900 | 8410 |
|  |  |  | 100 | 10300 | 7280 |

*continuing to rise after 7 days of testing

Figure 2:
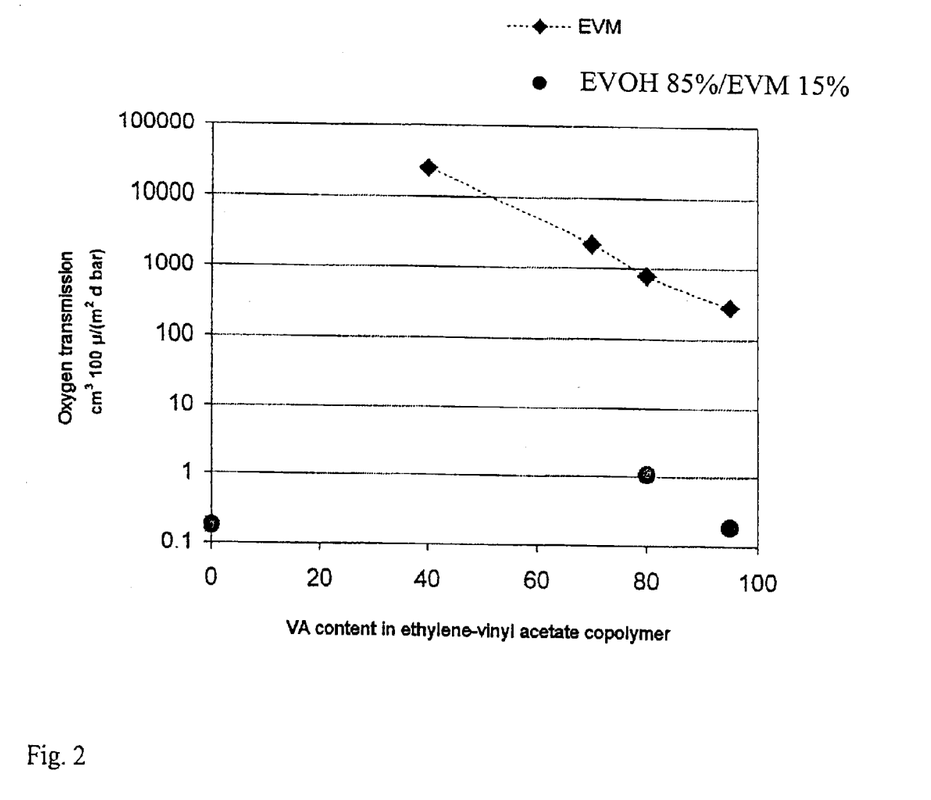
FIG. 2 illustrates the VA content in ethylene-vinyl acetate vs. the oxygen transmission standardized to 100 μm at 0% relative humidity, as reported in Table 2.

The values standardized to 100 µm are plotted graphically in FIG. 2.

TABLE 3

Determination of oxygen transmission of EVOH films, all at 23° C.

| Exp. | Type | Thickness | Relative humidity | Oxygen transmissions $cm^3/(m^2 d$ bar) | Standardized to 100µ $cm^3$ 100µ/ $(m^2$ d bar) |
|---|---|---|---|---|---|
| 3 | Blend 85% EVOH 15% Levapren ® 800 HV | 59.4 µm | 0 | 1.94 | 1.15 |
|  |  | 56.1 µm | 0 | 1.76 | 0.99 |
|  |  | 59.4 µm | 50 | 1.38 | 0.82 |
|  |  | 56.1 µm | 50 | 1.40 | 0.79 |
|  |  | 59.4 µm | 100 | 43.9 | 26.1 |
|  |  | 56.1 µm | 100 | 42.8 | 24.0 |

TABLE 3-continued

Determination of oxygen transmission of EVOH films, all at 23° C.

| Exp. | Type | Thickness | Relative humidity | Oxygen transmissions cm³/(m² d bar) | Standardized to 100μ cm³ 100μ/ (m² d bar) |
|---|---|---|---|---|---|
| 13 | Blend | 41.4 μm | 0 | 0.41 | 0.17 |
|  | 85% EVOH | 34.7 μm | 0 | 0.53 | 0.18 |
|  | 15% EVM | 41.4 μm | 50 | 0.29 | 0.12 |
|  | 95 | 34.7 μm | 50 | 0.39 | 0.14 |
|  |  | 41.4 μm | 100 | 8.48 | 3.51 |
|  |  | 34.7 μm | 100 | 9.75 | 3.38 |
| From EP-A1-1 022 309 | Comparison EVOH E (38 mol % ethylene) | 25 μm | 0 | 0.72 | 0.18 |
|  |  |  | 75 | 3.29 | 0.82 |
|  |  |  | 75 | 3.1 | 0.78 |
| From EP-A1-1 022 309 | EVOH D (29 mol % ethylene) | 25 μm | 0 | 0.1 | 0.03 |
|  |  |  | 75 | 1.41 | 0.35 |
|  |  |  | 75 |  |  |
| From EP-A1-1 022 309 | Blend: EVOH D 70% ethylene-acrylate 20% Reaction product of ethylene-acrylate-acid terpolymer with polyamide 10% | 25 μm | 0 | 0.61 | 0.15 |
|  |  |  | 75 | 6.79 | 1.70 |
|  |  |  | 75 | 5.6 | 1.4 |

It is apparent that the oxygen transmissions of the films from EVOH and ethylene-vinyl acetate copolymer were near to those of EVOH alone.

This is particularly surprising in the light of the comparatively poor barrier properties of ethylene-vinyl acetate copolymers alone.

Compared with the film described in EP-A1-1 022 309 and comprising EVOH with a ethylene-methyl acrylate copolymer and with a reaction product made from a terpolymer of ethylene, methyl acrylate and polyamide, the values obtained are better. It has to be taken into account here that the EVOH used here had higher ethylene content, and it is to be expected that this will give somewhat poorer values than EVOH with lower ethylene content.

The films of the present invention make it markedly simpler to achieve stretchablity than is stated in EP-A1-0 483 695, for example, where use has to be made of multi-ply films comprising EVOH with modified polyolefins, and of reaction products with polyamide.

TABLE 4

Examples 14 to 18 (Extrusion) Methods similar to that of Examples 1 to 13

| Experiment | Material | Thickness | Relative humidity | Oxygen transmission cm³/ (m²d bar) |
|---|---|---|---|---|
| 14a comparison | EVOH | 50 μm | — | — |
| 14b comparison | EVOH | 20 μm | 0% | 2–3 |
|  |  |  | 100% | 70 |
| 15 | EVOH 85% Levapren ®700 HV 15% | 20 μm | — | — |
| 16a | EVOH 85% Levapren ®800 HV 15% | 50 μm | 0% | 0.8–1.5 |
|  |  |  | 100% | 35 |
| 16b | EVOH 85% Levapren ®800 HV 15% | 20 μm | — | — |
| 17a | EVOH 85% EVM 95 15% Roll-milled blend | about 50 μm | — | — |
| 17b | EVOH 85% EVM 95 15% Roll-milled blend | 20 μm | — | — |
| 18a | EVOH 85% L 800 HV 15% Mixture extruded twice | 50 μm | — | — |
| 18b | EVOH 85% L 800 HV 15% Mixture extruded twice | 20 μm | — | — |

Example 16 repeats Example 3 and confirms the oxygen transmissions found.

TABLE 5

Extrusion Examples 14–18: Mechanical values for films of thickness 20 μm

| Example | Material | Thickness | Tensile strength | Tensile stress at break MPa | Tensile strain at break % |
|---|---|---|---|---|---|
| 14b comparison | EVOH | 20 μm | 55 | — | 25 |
| 15 | EVOH 85% Levapren ®700 HV 15% | 20 μm | 44 | 48 | 190 |
| 16b | EVOH 85% Levapren ®800 HV 15% | 20 μm | 55 | 47 | 168 |
| 17b | EVOH 85% EVM 95 15% Roll-milled blend | 20 μm | 77 | 79 | 231 |
| 18b | EVOH 85% Levapren ®800 HV 15% Mixture extruded twice | 20 μm | 102 | 102 | 277 |

Mechanical values: averaged from 3–5 individual specimens

Figure 1:
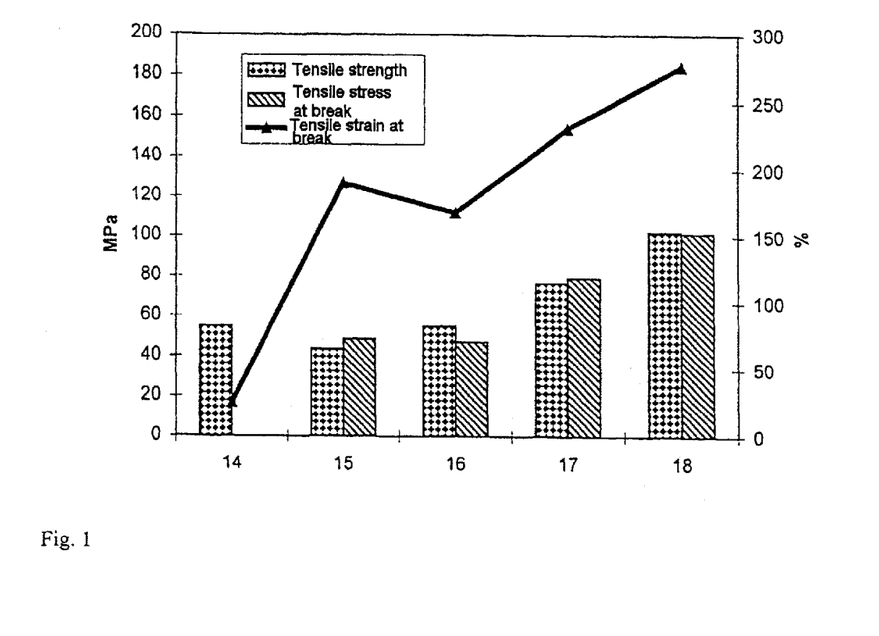
FIG. 1 illustrates the mechanical values from the extruded films of 20 μm thickness from Examples 14–18.

The results are shown in FIG. 1, which gives the mechanical values from the films of 20 μm thickness from Examples 14–18:
14: EVOH alone
15: 75% Levapren®700 HV 16: 15% Levapren®800 HV
17: EVM 95 alone
18: 15% Levapren®800 HV, extruded twice Alongside the good oxygen barrier properties reported for the films of the invention made from EVOH and ethylene-vinyl acetate copolymers, the tensile strain tests on these films in turn showed markedly improved stretchability without any substantial loss of strength. This, too, is surprising, since the ethylene-vinyl acetate copolymers used as blend partner can hardly be regarded as elastomers of the type given in the literature (EP-A1-0 722 850, EP-A1-0 761 477), where the classes of elastomer given, e.g. butyl rubber, SEBS and EPDM, have low polarity and glass transition temperatures well below 30° C.

The EVMs to be used in the films of the invention can certainly have glass transition temperatures around room temperature and higher without loss of the flexibility and improved stretchability of the films.

The EVOH/EVM films used here were studied by DSC.

TABLE 6

| Example | Material | Tg | Tmelt | Melting endotherm |
|---|---|---|---|---|
| 1 comparison | 31 μm EVOH | 49° C. | 165° C. | 76 J/g |
| 3 | Blend 85% EVOH 15% Levapren ® 800 HV | 39° C. | 161° C. | 51 J/g |
| 12 | Levapren ®400 | −31° C. | 13° C. and 44° C. | 30 J/g |
| 6 | Blend 85% EVOH 15% Levapren ®400 | 44° C. | 162° C. | 62 J/g |
| 4 | Blend 70% EVOH 30% Levapren ®800 HV | 44° C. | 162° C. | 56 J/g |
| 10 | Levapren ®800 HV | 0.7° C. | — | — |
| 9 | EVM 95 | 34° C. | — | — |
| 11 | Levapren ®700 HV | −16° C. | — | — |

Some of the films comprising EVOH showed a weak endotherm at 100° C., attributable to the liberation of bound water.

It was apparent that when crystalline EVM was used as film component with EVOH the result was EVA melting endotherm of only very weak character. Similarly, the glass transition points for the EVM blend partners were hardly discernible.

This indicates some degree of compatibility, but without the presence of miscibility. It appears that the ethylene-vinyl acetate copolymers of the invention become finely distributed in the EVOH, while no substantial clouding is observed.

Furthermore, the melting endotherm of the EVOH is hardly affected by the addition of EVM. It is clearly advantageous that the EVM of the invention increases the flexibility to the desired degree, but at the same time does not reduce the crystallinity of the EVOH, the result being that high permeation barriers are retained.

Experimental Examples of Production of Multilayer Films:
Materials used for the experiments Eval® L101B: Ethylene-vinyl alcohol copolymer with ethylene content of 27 mol % and MFI of 3.9 to ASTM 1238 (210° C., 2 160 g) (available from Kuraray).

Eval® F101B: Ethylene-vinyl alcohol copolymer with ethylene content of 32 mol % and MFI of 3.8 to ASTM 1238 (210° C., 2 160 g) (available from Kuraray).

Eval® G 156B: Ethylene-vinyl alcohol copolymer with ethylene content of 47 mol % and MFI of 14.7 to ASTM 1238 (210° C., 2 160 g) (available from Kuraray).

Soarnol® DT2903: Ethylene-vinyl alcohol copolymer with ethylene content of 29 mol % and MFI of 3.2 to ASTM 1238 (at 210° C.) (available from Nippon Gohsei)

Soarnol® AT4403: Ethylene-vinyl alcohol copolymer from the company Nippon Gohsei with ethylene content of 44 mol % and MFI of 3 to ASTM 1238 (at 210° C.).

Soarnol® H4815: Ethylene-vinyl alcohol copolymer with ethylene content of 48 mol % and MFI of 16 to ASTM 1238 (at 210° C.) (available from Nippon Gohsei)

EVOH-30: Ethylene-vinyl alcohol copolymer with ethylene content of 30 mol % and MFI of 10 to ASTM 1238 (at 210° C.)

Levamelt® 800: Ethylene-vinyl acetate copolymer with vinyl acetate content of 80% by weight and MFI of 4–5 to ASTM 1238(available from Bayer AG).

Vestamelt® 722: Polyamide copolymer with MFI of 300 to ASTM 1238 (160° C., 2.16 kg) and melting point of 107° C. (available from Degussa)

Vestamelt® 471: Polyamide copolymer with MFI of 20 to ASTM 1238 (160° C., 2.16 kg) and melting point of 119° C. (available from Degussa)

Durethan® C131F: Polyamide copolymer with melting point of 187–191° C. (available from Bayer AG)

Durethan® B38FKA: Polyamide with melting point of 222° C. (available from Bayer AG)

Experimental Series A:
Preparation of blends for barrier layer
Experimental apparatus: Twin-screw kneader (TSK), model ZSK 53 Rotation rate 165 rpm; melt temperature is set by means of the temperatures in the extrusion zones (200–215° C.)

Strand extrusion, 2 mm diameter, cooling in water bath at room temperature, knife-pelletized.
In Table 7, C2 is ethylene.

For layer B use was made of commercially available EVOH products (comparative examples), or else the blends of the invention from experimental series A. The polyamide (PA) is Durethan® B38FKA, a nylon-6 film material from Bayer AG.

In each case, films of nominal thickness 135 µm were produced for subsequent biaxial stretching, and films of thickness 48 µm were produced for the thermoforming process.
Data relating to Construction of Experiment:
4 extruders, leading to a 3-layer feed block,
feed block 270° C., die 280° C. at 3 different measurement points.

TABLE 7

Blends using ZSK machine, throughput 50 kg/h, residence time about 35 s, die temperature 200° C., 14 bar
Melt temperature 215° C. for F and G grades, 240° C. for L grade, data in part by weight

| Blend No. | EVOH | Proport. EVOH | EVM | Proport. EVM | Compat | Proport. Compat. | Pellets |
|---|---|---|---|---|---|---|---|
| 1 | G156B 47 mol % C2 | 85 | L800 | 15 | — | — | Hard |
| 2 | F101B 32 mol % C2 | 85 | L800 | 15 | — | — | Hard |
| 4 | L101B 27 mol % C2 | 85 | L800 | 15 | — | — | Hard |
| 5/1 | DT2903 29 mol % C2 | 80 | L800 | 15 | V471 | 5 | Hard |
| 5/2 | DT2903 29 mol % C2 | 80 | L800 | 15 | V722 | 5 | Hard |
| 5/3 | DT2903 29 mol % C2 | 80 | L800 | 15 | CI31F | 5 | Hard |
| 6 | L101B 27 mol % C2 | 70 | L800 | 30 | — | — | Somewhat soft |
| 7 | L101B- 27 mol % C2 | 60 | L800 | 40 | — | — | Soft |
| 8 | L101B 27 mol % C2 | 40 | L800 | 60 | — | — | Cold flow, tacky |
| 12 | AT4403 44 mol % C2 | 85 | L450 | 15 | — | — | Hard |
| 13 | EVOH-30 30 mol % C2 | 85 | L800 | 15 | — | — | Hard |

The pellets obtained were slightly opaque to white.
In the case of blends 5/1 to 5/3 in Table 7, copolyamides were added in order to test whether these can act as compatibilizers. The blend materials were extruded without difficulty to give strands, and could be chopped to give pellets after passage through a water bath. Blend 8 in Table 7 had surface tack when its temperature was raised, and exhibited cold flow on storage. Blends with a predominant proportion of ethylene-vinyl acetate copolymer were cooled for further processing, i.e. pellet-feed, or else on-line feed took place into appropriate film extruders.
Experimental Series B: Production of Three-Ply Films by Coextrusion
Three-ply films with layer sequence polyamide/layer B/polyamide were extruded, layer B being the barrier layer.

The layer thicknesses were determined by on-line radiometric thickness measurement, calibration being by means of an off-line measurement (micrometer). The thicknesses were primarily varied via the extruder rotation rates and the draw-off rate. The thickness of each layer was influenced via controlled switching off and on of the respective layer. The thickness of this layer was determined via the difference between the thickness prior to and the thickness after the switching-off or -on of the layer.

The on-line thickness measurement also served for monitoring the uniformity of the layer thicknesses. The slot die was initially set to maximum uniformity.

TABLE 8

| Film No. | PA layer made from B38FKA Thickness | Layer B Material | EVOH mol % Ethylene EVM VA % by wt. Parts by wt. EVOH: EVM | Thickness | PA layer made from B38FKA Thickness | Extrusion performance | Use |
|---|---|---|---|---|---|---|---|
| 1 Comp | 20 μm | L101B | EVOH 27 mol % No EVM 100:0 | 8 μm | 20 μm | Distribution not uniform | Thermo-forming |
| 2 Comp | 45 μm | L101B | EVOH 27 mol % No EVM 100:0 | 45 μm | 45 μm | Non-uniform distribution | BOPA |
| 3 Comp | 20 μm | H4815 | EVOH 48 mol % No EVM 100:0 | 8 μm | 20 μm | Distribution not uniform | Thermo-forming |
| 4 Comp | 45 μm | H4815 | EVOH 48 mol % NoEVM 100:0 | 45 μm | 45 μm | Very non-uniform distribution | BOPA |
| 5 | 20 μm | Blend 4 | EVOH 27 mol % EVM 80% by weight 85:15 | 8 μm | 20 μm | Uniform distribution along the die | Thermo-forming |
| 6 | 45 μm | Blend 4 | EVOH 27 mol % EVM 80% by wt. 85:15 | 45 μm | 45 μm | | BOPA |
| 7 | 20 μm | Blend 6 | EVOH 27 mol % EVM 80% by wt. 70:30 | 8 μm | 20 μm | | Thermo-forming |
| 8 | 45 μm | Blend 6 | EVOH 27 mol % EVM 80% by wt. 70:30 | 45 μm | 45 μm | | BOPA |
| 9 | 20 μm | Blend 7 | EVOH 27 mol % EVM 80% by wt. 60:40 | 8 μm | 20 μm | | Thermo-forming |
| 10 | 45 μm | Blend 7 | EVOH 27 mol % EVM 80% by wt. 60:40 | 45 μm | 45 μm | | BOPA |
| 11 | 20 μm | Blend 8 | EVOH 27 mol % EVM 80% by wt. 40:60 | 8 μm | 20 μm | Non-uniform distribution through non-regular feed, bridging in extruder for B | Thermo-forming |
| 12 | 45 μm | Blend 5/3 | EVOH 29 mol % EVM 80% by wt. copolyamide 80:15:5 | 45 μm | 45 μm | Fisheyes in edge region, disappear once temperature raised, some holes on chill roll due to moisture | BOPA |

TABLE 8-continued

| Film No. | PA layer made from B38FK A Thickness | Layer B Material | EVOH mol % Ethylene EVM VA % by wt. Parts by wt. EVOH: EVM | Thickness | PA layer made from B38FK A Thickness | Extrusion performance | Use |
|---|---|---|---|---|---|---|---|
| 13 | 20 μm | Blend 5/3 | EVOH 29 mol % EVM 80% by wt. copolyamide 80:15:5 | 8 μm | 20 μm | — | Thermo-forming |
| 14 | 45 μm | Blend 12 | EVOH 44 mol % EVM 45% by wt. 85:15 | 45 μm | 45 μm | Fisheyes in edge region | BOPA |
| 14b | 20 μm | Blend 12 | EVOH 44 mol % EVM 45% by wt. 85:15 | 8 μm | 20 μm | — | Thermo-forming |

The films were produced with a casting roll temperature of from 80 to 100° C., passed through on-line thickness measurement and wound-up after edge-trim.

Viscosities of EVOHs Used and of Blends From Experimental Series A:

The shear rate during extrusion processes for films or thin moldings through dies is in the range from 1 bis 100 s⁻1. For good extrusion, materials with low viscosities are preferred. The viscosities of blends with various EVM contents are therefore measured with optimum extrusion shear rates, as shown in Table 9.

As Table 9 shows, the higher the percentage content of EVM in the blend, the lower the viscosity compared with EVOH alone.

TABLE 9

| Blend No. | % proportion of Levamelt ® 800 in blend with L101B | Viscosity η* at 300 s⁻¹ in Pa.s |
|---|---|---|
| — | 0 | 800 |
| 4 | 15 | 620 |
| 6 | 30 | 420 |

TABLE 9-continued

| Blend No. | % proportion of Levamelt ® 800 in blend with L101B | Viscosity η* at 300 s⁻¹ in Pa.s |
|---|---|---|
| 7 | 40 | 400 |
| 8 | 60 | 290 |
| — | 100 | 150 |

Viscosity η* in Pa.s is measured as a function of shear rate (given as angular velocity omega in 1/s).

The specimens were first dried for more than 16 hours at 80° C. in a vacuum cabinet and then pressed to give test specimens, using the laboratory press at 200° C. The measurements were carried out in the ARES oscillation rheometer from the company Rheometric, using plat—plate geometry PP25 in the frequency range from 10 to 0.1 Hz and at temperatures of from 180° C. to 260° C.

Experimental Series C:

Stretching experiments for the manufacture of biaxially oriented polyamide (BOPA) multilayer films.

Simultaneous bi-axial stretching.

TABLE 10

| Experimental film Roll No. | 2 | 6-I | 6-II | 6-III | 6-IV | 6-V | 6-VI | 6-VII | 6-VIII | 8-I | 8-II |
|---|---|---|---|---|---|---|---|---|---|---|---|
| Frame width | | | | | | | | | | | |
| Longitudinal (mm) | 750 | 750 | 500 | 500 | 375 | 375 | 375 | 500 | 500 | 500 | 625 |
| Transverse (mm) | 625 | 625 | 500 | 500 | 375 | 375 | 375 | 500 | 500 | 500 | 625 |
| Specimen size | | | | | | | | | | | |
| Longitudinal (mm) | 250 | 250 | 250 | 250 | 250 | 250 | 250 | 250 | 250 | 250 | 250 |
| Transverse (mm) | 250 | 250 | 250 | 250 | 250 | 250 | 250 | 250 | 250 | 250 | 250 |
| Stretching conditions | | | | | | | | | | | |
| Stretching temperature (° C.) | 230 | 240 | 250 | 240 | 240 | 240 | 230 | 230 | 230 | 230 | 230 |
| Preheat time (s) | 90 | 120 | 150 | 120 | 120 | 180 | 120 | 120 | 150 | 180 | 180 |

TABLE 10-continued

| | | | | | | | | | | | |
|---|---|---|---|---|---|---|---|---|---|---|---|
| Control square on stretched film | | | | | | | | | | | |
| Longitudinal (mm) | 3 | 3 | 2 | 2 | 1.5 | 1.5 | 1.5 | 2 | 2 | 2 | 2.5 |
| Transverse (mm) | 2.5 | 2.5 | 2 | 2 | 1.5 | 1.5 | 1.5 | 2 | 2 | 2 | 2.5 |
| Experimental film Roll No. | 8-IIa | 8-III | 8-IV | 8-V | 2-Ib | 2-IIb | 4-I | 4-II | 14-I | 14-II | 14-III |
| Frame width | | | | | | | | | | | |
| Longitudinal (mm) | 625 | 625 | 500 | 500 | 500 | 500 | 500 | 500 | 500 | 500 | 500 |
| Transverse (mm) | 625 | 625 | 500 | 500 | 500 | 500 | 500 | 500 | 500 | 500 | 500 |
| Specimen size | | | | | | | | | | | |
| Longitudinal (mm) | 250 | 250 | 250 | 250 | 250 | 250 | 250 | 250 | 250 | 250 | 250 |
| Transverse (mm) | 250 | 250 | 250 | 250 | 250 | 250 | 250 | 250 | 250 | 250 | 250 |
| Stretching conditions | | | | | | | | | | | |
| Stretching temperature (° C.) | 230 | 235 | 235 | 230 | 230 | 225 | 225 | 225 | 225 | 230 | 230 |
| Preheat time (s) | 180 | 180 | 180 | 180 | 180 | 180 | 180 | 210 | 180 | 180 | 120 |
| Control square on stretched film | | | | | | | | | | | |
| Longitudinal (mm) | 2.5 | 2.5 | 2 | 2 | 2 | 2 | 2 | 2 | 2 | 2 | 2 |
| Transverse (mm) | 2.5 | 2.5 | 2 | 2 | 2 | 2 | 2 | 2 | 2 | 2 | 2 |

TABLE 11

| BOPA No. | Barrier layer EVOH mol % ethene EVM % by wt. VA Parts by wt. EVOH: EVM | Prior optical properties | Optical properties after stretching | Remark |
|---|---|---|---|---|
| 2 | EVOH 27 mol % No EVM Comparison | transp. | | Film tore using the initial conditions, no stretching achieved. Temperature increased to 240° C., heating time lengthened to 120 s |
| 6-I | EVOH 48 mol % No EVM Comparison | opaque | transp. | Film tore, temperature increased to 250° C. and heating time lengthened to 150 s |
| 6-II | As for 6-I | opaque | transp. | Yellowing of film |
| 6-III | As for 6-I | opaque | transp. | Film break-off |
| 6-IV | As for 6-I | opaque | transp. | Film stretchable without tearing but some cloudiness, appearance somewhat inhomogeneous |
| 6-V | As for 6-I | opaque | transp. | Film stretchable without tearing, some holes found, some cloudiness, appearance somewhat inhomogeneous, film has traces of imprints, therefore subsequent films cleaned with acetone |
| 6-VI | As for 6-I | opaque | transp. | Film stretchable without tearing. Unstretched areas are detectable, and the stretching ratio can therefore be further increased |
| 6-VII | As for 4 | opaque | transp. | Repeat, further stretching possible |
| 6-VIII | As for 4 | opaque | transp. | Further stretched, but still not stretched to maximum |
| 8-I | EVOH 27 mol % EVM 80% by wt. 85:15 | opaque | transp. | Not yet stretched to maximum |
| 8-II | As for 8-I | opaque | transp. | Break-off |
| 8-IIa | As for 8-I | opaque | transp. | Break-off, temperature not high enough |
| 8-III | As for 8-I | opaque | transp. | Film break-off, stretching ratio has to be lowered somewhat |
| 8-IV | As for 8-I | opaque | transp. | Film break-off, temperature may be too high |
| 8-V | As for 8-I | opaque | transp. | Incipient tearing of film |
| 2-Ib | EVOH 27 mol % No EVM Comparison | transp. | cloudy, | Incipient tearing of film, phase separation |
| 2-IIb | EVOH 27 mol % No EVM Comparison | transp. | cloudy | Film does not tear, layer structures, 'scimitar' |
| 4-II | EVOH 48 mol % No EVM Comparison | transp. | cloudy | No incipient tearing, but phase separation |
| 4-II | EVOH 48 mol % No EVM Comparison | transp. | cloudy | No incipient tearing, film becomes cloudy, very streaky, phase separation |
| 14-I | EVOH 44 mol % EVM 45% by wt. 85:15 | opaque | | No incipient tearing, film somewhat streaky |
| 14-II | EVOH 44 mol % EVM 45% by wt. 85:15 | opaque | | Some incipient tearing, some flow structures |

TABLE 11-continued

| BOPA No. | Barrier layer EVOH mol % ethene EVM % by wt. VA Parts by wt. EVOH:EVM | Prior optical properties | Optical properties after stretching | Remark |
|---|---|---|---|---|
| 14-III | As for 14-III | | opaque | Some incipient tearing, some flow structures |

Oxygen Transmission Values:

These oxygen transmission values were determined by means of an OX-TRAN device from the company Mocon, with electrochemical O₂ detector.

| Test parameters: | Pressure: | 1000 mbar O₂ |
|---|---|---|
| | Gas moisture: | dry |
| | Temperature: | 23 degrees Celsius |

TABLE 12

| Film No. | Layer B | Barrier layer EVOH mol % ethene EVM % by wt. VA Parts by wt. EVOH:EVM | Total film thickness | Gas transmission cm³/m² 24 h bar | |
|---|---|---|---|---|---|
| 1 Comp | L101B | EVOH 27 mol % ethene No EVM 100:0 | 44.7 44.6 | about 1 about 1 | — |
| 2 Comp | L101B | EVOH 27 mol % ethene No EVM 100:0 | 36 23 | about 1 about 1 | BOPA after stretching BOPA No. 2 |
| 3 Comp | H4815 | EVOH 48 mol % ethene No EVM 100:0 | 45.2 46.6 | 8.5 8.6 | — |
| 4 Comp | H4815 | EVOH 48 mol % ethene No EVM 100:0 | 28 25 | 17 16 | BOPA after stretching BOPA No. 4 |
| 5 | Blend 4 | EVOH 27 mol % ethene EVM 80% by wt. VA 85:15 | 46.2 42.7 | about 1 about 1 | — |
| 6 | Blend 4 | EVOH 27 mol % ethene EVM 80% by wt. VA 85:15 | 22 | about 1 | BOPA after stretching BOPA No. 6 |
| 7 | Blend 6 | EVOH 27 mol % ethene EVM 80% by wt. VA 70:30 | 43.4 44.4 | about 1 about 1 | — |
| 8 | Blend 6 | EVOH 27 mol % ethene EVM 80% by wt. VA 70:30 | 18 | 23 | BOPA after stretching BOPA No. 8 Specimen non-regular in nature |
| 9 | Blend 7 | EVOH 27 mol % ethene EVM 80% by wt. VA 60:40 | 47.5 42.4 | about 1 about 1 | Thermo-forming |
| 11 | Blend 8 | EVOH 27 mol % ethene EVM 80% by wt. VA 40:60 | 39.7 39.5 | 30 30 | — |
| 13 | Blend 5/3 | EVOH 29 mol % ethene EVM 80% by wt. VA Copolyamide 80:15:5 | 46.7 43.5 | about 1 about 1 | BOPA |
| 14 | Blend 12 | EVOH 44 mol % ethene EVM 45% by wt. VA 85:15 | 29 32 | 11 11 | BOPA after stretching BOPA No. 14 |
| 14b | Blend 12 | EVOH 44 mol % ethene EVM 45% by wt. VA 85:15 | 47.0 43.5 | 6.6 6.1 | — |

For certain specimens the entry "about 1" is given because the high oxygen barrier meant that it was impossible to determine oxygen transmission precisely and unambiguously during the test time. However, the actual values are below this value.

Thermoformability:

The thermoformability of the films was determined qualitatively by way of an apparatus in which a piece of film of about 10×10 cm was clamped into a frame, heated by means of an IR lamp, and then drawn by vacuum into a mould composed of a rounded stepped pyramid (4 steps of 1.5 cm height). This gave a variety of strain levels.

It was found that the films of the present invention could be thermoformed to give transparent, thin layers, whereas the comparative films tended to become optically inhomogeneous (phase separation) at high strain levels.

Film 4: White streaks formed, cloudy areas in the direction of strain

Film 6: Initially cloudy film becomes transparent in the thermoformed regions

Behavior of films 6, 8 and 14 similar to that of film 6

Morphology of Resultant Films:

Studies by TEM (transmission electron microscopy) after RuO₄ contrasting.

The following films were used here and in each case the morphology of the inner barrier layer was studied, using magnifications of 3 500 and 10 000.

Film 4 (comparison): No structuring detectable

Barrier Layers with EVOH and EVM (80% by Weight of Vinyl Acetate)

Film 5: elongate particles (EVM, proportion 15% by weight) of about 0.5×5 μm and smaller Film 7: elongate particles or elongate lamellae of about 1 μm (EVM proportion 30% by weight)

Film 8 after stretching: oval particles to some extent with inclusions of EVOH up to about 2 μm (EVM proportion 30% by weight)

Film 9: elongate lamellae up to 2 μm thickness and small particles with diameter of from 0.4 to 1 μm (EVM proportion 40% by weight)

Film 11: EVM forms the continuous phase with EVOH particles of size 2 μm (EVM proportion 60% by weight)

Barrier Layers with EVOH and EVM (80% by Weight of Vinyl Acetate) and Copolyamide (Copa)

Film 13: spherical particles of size from 0.4 to 1 μm (EVM proportion 15% by weight, 5% by weight of Copa)

Barrier Layers with EVOH and EVM (45% by Weight of Vinyl Acetate)

Film 14: spherical particles of size from 0.2 to 0.8 μm, with relatively narrow distribution Assessment of Films From Experimental Series B Films 1 to 4 (comparison) were transparent and their visual assessment was comparable with that of films of similar thickness made from polyamide alone.

Films 5 to 14b are opaque to slightly cloudy, the thick films (intended for stretching) being markedly less transparent than the thinner variants.

Greater proportions of blend partner in the barrier layer led to more marked cloudiness.

All of the films were macroscopically homogeneous.

Due to irregularities in pellet feed (tackiness of pellets), film 8 was always obtained with non-regular barrier layer thickness.

Film 12 had holes, and these could be attributed to moisture in the blend material.

Film 14 had fisheyes in the edge region. These could be eliminated by varying the temperature.

When comparison is made with the comparative films, markedly better extrusion is observed using the blends of the present invention. The addition of ethylene-vinyl acetate copolymer has a favorable effect on viscosity behavior during cast film production.

Assessment of Viscosity of EVOH's used and of the Blends of the Invention:

When comparison is made with EVOH alone, the ethylene-vinyl acetate copolymer Levamelt® 800 exhibited much more marked viscosity lowering through shear (shear thinning). The admixture of Levamelt into the EVOH (blends 3, 6, 7 and 8) led to marked shear thinning in the mixture, although the Levamelt was merely present as a separate phase dispersed in the EVOH matrix. The result of this was easier extrusion of the blends of the invention when comparison is made with EVOH alone, particularly under the conditions of film extrusion, where the material has to pass uniformly through very narrow gaps.

Assessment of Stretching in Experimental Series C:

Closer inspection of the films showed that all of the comparative films were transparent prior to stretching, but after stretching appeared non-regular in structure. The stretched areas of these comparative films were either cloudy or had tears due to separation of the plies.

The films with the barrier layer of the invention became transparent as a result of stretching. In all of the stretching experiments, the setting of the ideal stretching conditions required prolonged trials and was markedly dependent on temperature. No variation in the stretching rate was made at this stage. There remains a possibility of further optimization to give greater stretching ratios, since there is some indication that the films of the invention with the barrier blends had not been stretched to the maximum.

The optical properties of the comparative films became poorer after stretching, and this could be attributed to phase separation, which is not observed with the films of the invention. The criterion of contact transparency was always complied with.

Assessment of Oxygen Transmission:

It was found that when the stretched films were compared with the films of the same composition, their oxygen transmission could be calculated from the thickness.

Compared with the films with the barrier layers of EVOH alone, the films of the invention have unchanged, excellent barrier values. The oxygen transmissions begin to rise only when the admixture of ethylene-vinyl acetate copolymer reaches 60% by weight. The proportion of ethylene-vinyl acetate copolymer in the barrier layer should therefore not substantially exceed 50% by weight.

A conclusion which may be drawn is that in the blends made from EVOH and EVM with proportions of up to at least 40% by weight of EVM this was present in the form of a discontinuous phase. In a matrix made from EVOH, the EVM formed particles of elongate shape. Increasing the proportion of EVM led to structures, which were to some extent lamellar, and this is advantageous for retention of barrier properties. After stretching, involving a heat-conditioning step, the shape of the EVM particles changed in that the lamellar particles become particles whose shape is rather spherical. The formation of the discrete EVM phase within the EVOH phase in the multilayer product of the invention provides a good basis for the stretching/thermoforming of the barrier layer. The matrix made from EVOH determines the barrier properties here.

If, as in film 11, the proportion of EVM markedly exceeds that of EVOH, phase inversion occurs. It could be assumed that layers of this type have lost the barrier properties typical of EVOH.

In film 13 the effect of adding a copolyamide as compatibilizer could be observed. Spherical particles were obtained. It may be assumed that this phase morphology remains stable even through stretching and heat-conditioning processes.

Finally, in film 14 the effect of using a less polar EVM was observed. Here, the EVM has particularly fine distribution.

Particular stabilization of the distribution of the EVM could be achieved by adding copolyamides as third component in the barrier layer. The stability of the morphology could be secured by this method during multiple processing (use of recycled material) and during heat-conditioning. The result was retention of fine-particle dispersion of the EVM in the EVOH matrix, and thus transparency was ensured.

The better stretchability of the films with the barrier layers of the invention is particularly noticeable when using the EVM grade with 80% by weight of vinyl acetate, and less noticeable when using the EVM grade with 45% by weight of vinyl acetate. This may be connected to the highly extended structure of the EVM phase, which has a particularly noticeable flexibilizing effect.

The result for the person skilled in the art was therefore the ability to optimize flexibility properties, and in particular stretchability in the composite with PA and secondly the establishment of smaller particle sizes for the EVM phase. This permitted control of transparency and of morphological stability. Factors, which should be regarded as significant here, are the selection of the EVM and the addition of copolyamides.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A single- or multilayer film comprising α-olefin-vinyl alcohol copolymers and at least one α-olefin-vinyl acetate copolymer, wherein the α-olefin vinyl acetate copolymer has vinyl acetate repeat units present in the range from 40 to 99.99% by weight.

2. The film according to claim 1, wherein the α-olefin is selected from ethylene, propene, n-butene, i-butene, pentene, hexene, 1-hexene, heptene, octene, 1-octene and mixtures of these.

3. The film according to claim 1, wherein the α-olefin-vinyl acetate copolymer contains at least 45% by weight of vinyl acetate repeat units.

4. The film according to claim 3, wherein the α-olefin-vinyl acetate copolymer contains at least 65% by weight of vinyl acetate repeat units.

5. A process for producing a single film having α-olefin-vinyl alcohol copolymers and at least one α-olefin-vinyl acetate copolymer, wherein the α-olefin vinyl acetate copolymer has vinyl acetate repeat units present in the range from 40 to 99.99% by weight comprising the step of mixing the copolymer in a mixer with additional constituents.

6. Multilayer film having α-olefin-vinyl alcohol copolymers and at least one α-olefin-vinyl acetate copolymer, wherein the α-olefin vinyl acetate copolymer has vinyl acetate repeat units present in the range from 40 to 99.99% by weight, wherein the multilayer film comprises at least one layer A and at least one layer B, wherein, A comprises a thermoplastic polymer and B comprises an α-olefin-vinyl alcohol copolymer and an α-olefin-vinyl acetate copolymer whose vinyl acetate content is in the range from 40 to 95% by weight.

7. Multilayer film according to claim 6, wherein the thermoplastic polymer is polyamide or polypropylene.

8. Multilayer film according claim 6, wherein the α-olefin-vinyl alcohol copolymer is ethylene-vinyl alcohol copolymer having an ethylene content in the range from 20 to 75 mol %.

9. Multilayer film according to claim 6, wherein the α-olefin-vinyl acetate copolymer is ethylene-vinyl acetate copolymer.

10. Multilayer film according to claim 6 having a layer sequence of A,B,A.

11. Multilayer film according to claim 10, wherein the layer sequences is polyamide, layer B, polyamide.

12. Multilayer film according to claim 10, wherein the layer sequence is polypropylene, layer B, polypropylene.

13. Multilayer film according to claim 6, wherein layer B comprises additionally up to 25% by weight of a copolyamide with a melting point in the range from 70° to 200° C.

14. Multilayer product according to claim 12, wherein the layer sequence is polypropylene, layer B, polypropylene and wherein a polymer suitable to improve the cohesion is between each pair of layers.

15. Process for producing the multilayer film having α-olefin-vinyl alcohol copolymers and at least one α-olefin-vinyl acetate copolymer, wherein the α-olefin vinyl acetate copolymer has vinyl acetate repeat units present in the range from 40 to 99.99% by weight comprising the step of coextruding the film of the α-olefin-vinyl acetate copolymer/α-olefin-vinyl alcohol copolymer.

16. Process for producing the multilayer film having α-olefin-vinyl alcohol copolymers and at least one α-olefin-vinyl acetate copolymer, wherein the α-olefin vinyl acetate copolymer has vinyl acetate repeat units present in the range from 40 to 99.99% by weight comprising the step of laminating the film of the α-olefin-vinyl acetate copolymer/α-olefin-vinyl alcohol copolymer.

17. Packaging material comprising the single- or multilayer film having α-olefin-vinyl alcohol copolymers and at least one α-olefin-vinyl acetate copolymer, wherein the α-olefin vinyl acetate copolymer has vinyl acetate repeat units present in the range from 40 to 99.99% by weight.

* * * * *